United States Patent [19]
Pluck

[11] 3,748,527

[45] July 24, 1973

[54] HORIZONTAL DRIVER CIRCUIT FOR TELEVISION RECEIVER

[75] Inventor: Mervyn M. Pluck, Portsmouth, Va.

[73] Assignee: General Electric Company, Portsmouth, Va.

[22] Filed: Oct. 13, 1971

[21] Appl. No.: 188,932

[52] U.S. Cl. ............... 315/26, 331/112, 315/27 TD
[51] Int. Cl. ............... H01j 29/70
[58] Field of Search ............... 331/112; 328/58, 328/57, 68; 315/27 R, 27 TD, 28, 29, 26

[56] References Cited

UNITED STATES PATENTS

| | | | |
|---|---|---|---|
| 3,034,013 | 5/1962 | Bourqet | 315/27 TD |
| 3,275,847 | 9/1966 | Kitchin | 315/27 TD |
| 3,302,033 | 1/1967 | Goodrich | 315/27 TD |
| 3,360,742 | 12/1967 | Chi-Sheng Liu | 331/112 |

*Primary Examiner*—Carl D. Quarforth
*Assistant Examiner*—J. M. Potenza
*Attorney*—W. J. Shanley, Stanley C. Corwin, F. W. Powers, Frank L. Neuhauser, Oscar B. Waddell and Joseph B. Forman

[57] ABSTRACT

A system for producing a horizontal deflection drive pulse having a closely regulated duration. A driver transistor is coupled to the primary winding of a transformer, and is adapted to receive periodic pulses from an oscillator. A second, timer transistor is operated by signals derived from a secondary winding of the transformer and serves to regeneratively drive the first transistor into full conduction. An R–C timing circuit coupled to the base of the timer transistor serves to determine the period of time for which the timer transistor maintains the driver transistor in a conductive state. The duration of the pulse produced by the driver transistor is thus primarily a function of the R–C timing circuit characteristics, and remains substantially constant in the presence of variations in supply voltage, in the characteristics of the driver or timer transistors, or in the presence of variations in the waveshape of the periodic pulses provided by the oscillator.

4 Claims, 4 Drawing Figures

PATENTED JUL 24 1973 3,748,527

HORIZONTAL DRIVER CIRCUIT FOR TELEVISION RECEIVER

BACKGROUND OF THE INVENTION

The present invention relates to pulse forming circuitry and, more particularly, to means for forming pulses of a predetermined duration in response to incoming signals.

Television receiver circuits necessarily include means for producing signals which eventuate in the periodic deflection of an electron beam across the face of a cathode ray tube. While such deflection signals are produced in synchronism with received video signals, their formation and value is a function of the receiver circuitry. Means are commonly provided in a receiver for producing pulses which correspond in time to synchronizing pulses included in a received video signal. The synchronizing pulses are abstracted from the signal by suitable gating means and, in the case of the horizontal synchronizing signals, either applied to a phase detector for controlling the frequency of an oscillator, or applied directly to the oscillator circuit itself. The oscillator circuit then produces pulses in close synchronism with the received sync signals. While the sync signal may serve to trigger or control the timing of the produced pulses, the configuration and magnitude of the pulses are solely functions of the oscillator circuit.

Horizontal driving pulses are commonly produced by driving an electronic device such as a tube or transistor in a class C mode such that the device conducts only a portion of a periodic, oscillatory waveform. The conducted portion of the waveform corresponds to a substantially trapezoidal wave, e.g., a pulse with sloping sides and a substantially rounded upper portion which may or may not have ripples or spikes superimposed thereon. This signal is then applied to a further electronic device which is biased in a manner so as to conduct only a portion of the waveform which extends to a predetermined amplitude. This operation, termed "clipping," when combined with suitable amplification of the resultant clipped wave produces a rectangular wave suitable for application to output stages of the horizontal drive circuit.

However, while the above-described signal processing method has the advantage of being relatively simple, it has an inherent shortcoming in that, due to the sloping sides of the clipped pulse, the duration of the resulting signal is a function of the voltage level at which the pulse is clipped. Variations in circuit parameters due to aging or temperature or fluctuations in source voltages will therefore vary the clipping level, and thus the pulse duration.

It will therefore be seen that it would be highly desirable to provide an improved driver circuit for a television receiver which produces pulses whose duration remains constant despite changes in supply voltage levels and circuit parameters.

It is therefore an object of the present invention to provide an improved horizontal deflection system drive circuit for a television receiver.

It is another object of this invention to provide a pulse-forming circuit to be triggered by an oscillator, which does not require closely regulated input signals for its operation.

It is still another object of the present invention to provide a horizontal driver circuit which produces voltage pulses of a consistent configuration despite fluctuations in oscillator signals applied thereto.

SUMMARY OF THE INVENTION

Briefly stated, in accordance with one aspect of the invention, the foregoing objects are achieved by providing a substantially self-contained pulse producing circuit which may be capacitively coupled to receive signals outputted by a horizontal oscillator. Pulses produced by the oscillator serve to trigger the pulse forming circuit, initiating the conduction of a first, driver transistor. The driver transistor draws current through the primary winding of a transformer, the secondary winding of which is coupled by means of an R-C timing circuit to a second, timer transistor. The transformed pulse tends to disable the timer transistor so that a low-impedance biasing potential is applied to the base terminal of the driver transistor, forward-biasing the transistor. The driver transistor then conducts harder, tending to turn the timer transistor off still further.

When a predetermined time has elapsed after the pulse produced by the driver transistor attains its maximum value, the R–C timing circuit allows the voltage at the base of the timer transistor to decay to such a value that as the timer transistor re-enters the conductive mode and begins to shunt the forward-biasing potential from the driver transistor, initiating a diminution of current through the primary winding of the transformer. The now-diminishing signal is transmitted by way of the timing circuit to the timer transistor, which then turns on still further and serves to more rapidly disable the driver transistor, until the pulse is terminated. The timer transistor thus serves to apply regenerative feedback to the driver transistor to facilitate the rapid commencement and decline of a voltage pulse, while the duration of the pulse is primarily a function of the parameters of the R–C timing circuit. Variations in supply voltages, temperature, and transistor characteristics thus have little effect upon the pulse duration.

BRIEF DESCRIPTION OF THE DRAWING

While the specification concludes with claims particularly pointing out and distinctly claiming the subject matter which is regarded as the invention, it is believed that the invention will be better understood from the following description of the preferred embodiment, taken in conjunction with the accompanying drawing in which:

DESCRIPTION OF THE PREFERRED EMBODIMENT

Figure 1:
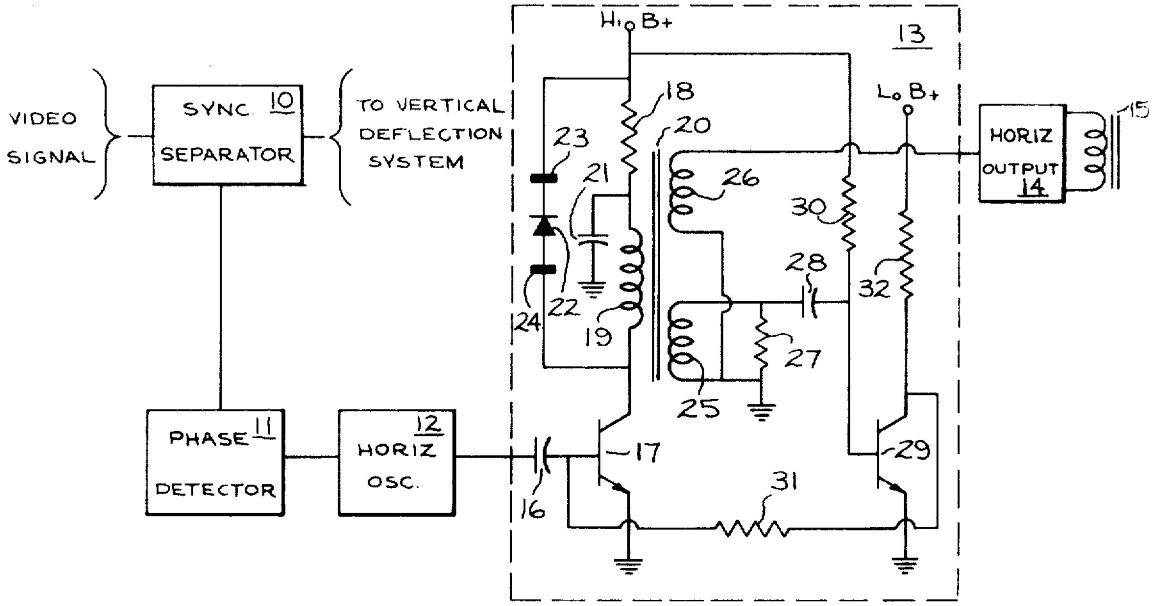
FIG. 1 is a schematic drawing of selected portions of a television receiver circuit, including the inventive driver circuit.

FIG. 1 shows the inventive circuit, in combination with selected portions of a typical television receiver. A video signal derived from video processing circuitry (not shown) is applied to a sync separator 10 which serves to abstract synchronizing pulses and apply them to vertical and horizontal deflection systems. The horizontal synchronizing pulses are applied to a phase detector 11 which operates to constrain horizontal oscillator 12 to operate in synchronism with the received video signal. It should be recognized, however, that alternative arrangements may be utilized. For instance, phase detector 11 may be eliminated and the horizontal sync pulses produced by sync separator 10 applied directly to a suitable horizontal oscillator 12 to cause the oscillator to run in synchronism with the video signal.

Pulses produced by horizontal oscillator 12 are transferred to a driver circuit 13 which comprises a preferred form of the present invention. Driver circuit 13 produces pulses of a closely regulated magnitude and duration, as will be described hereinafter. The pulses outputted by driver circuit 13 are then applied to a horizontal output stage 14 which advantageously includes an electronic device such as a tube or transistor which is gated in conduction by pulses produced by the driver circuit 13. The horizontal deflection current provided by output stage 14 is then applied to a deflection yoke 15 for producing a magnetic field which deflects an electron beam across the face of a cathode ray tube in synchronism with the video signal being processed by the receiver.

Returning to driver circuit 13, pulses produced by the horizontal oscillator 12 traverse a coupling capacitor 16 and impinge upon the base terminal of a first, driver transistor 17. A current limiting resistor 18 and the primary winding 19 of a transformer 20 are coupled in series between the collector terminal of driver transistor 17 and a source of fixed potential, herein denominated Hi $B^+$. A filter capacitor 21 is coupled from the intersection of resistor 18 and primary winding 19 to ground, and a diode 22 is placed in shunt about the primary winding to provide a path for current surges which arise in primary winding 19 when driver transistor 17 is suddenly disabled. A pair of ferrite beads 23 and 24 are disposed about the conductors attached to the ends of diode 22 to suppress RF radiation.

Pulses arising in the primary winding 19 of transformer 20 are coupled to a secondary winding 25 and a tertiary winding 26 of the transformer. A resistor 27 is coupled in shunt about secondary winding 25 for damping out transients or resonant frequencies which may occur thereacross. A timing capacitor 28 couples secondary winding 25 to the base terminal of a second, timer transistor 29, while a timing resistor 30 couples the base terminal to a source of bias potential denominated Hi $B^+$ which may advantageously be the same source which is coupled to transistor 17. A pair of series-connected resistors 31 and 32 couple the base terminal of driver transistor 17 to a suitable source of bias potential Lo $B^+$ which is of a somewhat lesser value than the potential source Hi $B^+$ coupled to the base of transistor 29. The collector terminal of timer transistor 29 is coupled to the intersection of resistors 31 and 32, while the emitter thereof is connected to ground so that the timer transistor may serve to shunt biasing potential from the base terminal of driver transistor 17.

The operation of the driver circuit 13 will now be described with reference to the numbered elements of FIG. 1. It will be seen that due to the connection of the base and collector terminals of timer transistor 29 to suitable sources of bias potential the timer transistor will be in a fully conductive state under quiescent conditions. Upon the production of a positive-going pulse by horizontal oscillator 12, the pulse is transmitted by way of coupling capacitor 16 to the base terminal of driver transistor 17. Driver transistor 17 is momentarily biased into a conductive mode due to the charge flowing to the base terminal coupling capacitor 16. As transistor 17 begins to conduct, current is drawn downwardly from the source of biasing potential through current limiting resistor 18 and primary winding 19 of transformer 20. The negative-going voltage which now occurs at the collector terminal of transistor 17 is inductively coupled into both secondary winding 25 and tertiary winding 26 of the transformer. The rapidly-dropping voltage is transmitted by way of timing capacitor 28 to the base terminal of timer transistor 29, causing the conductivity of the timer transistor to diminish and thus raising the voltage at the collector terminal thereof. The increasing voltage arising at the collector of timer transistor 29 is fed back through resistor 31 to the base terminal of driver transistor 17, tending to turn transistor 17 on still further. This effects an increased current flow through primary winding 19, and a corresponding voltage change across secondary winding 25 and tertiary winding 26, eventuating in a still further decrease in the conductivity of timer transistor 29. This activity continues with increasing rapidity until driver transistor 17 is fully conductive, timer transistor 29 is cut off and the maximum available current is flowing through primary winding 19. As the rate of change of current flowing through the primary winding diminishes the voltage across timing capacitor 28 begins to decline as charge accrued thereon bleeds away through timing resistor 30.

As the bias across capacitor 28 rises toward its quiescent value, the base terminal of timer transistor 29 nears a forward-biased or conductive mode. As transistor 29 enters the conductive mode, the voltage at the collector terminal thereof begins to drop and the declining voltage is fed back through resistor 31 to the base terminal of driver transistor 17. This activity tends to diminish the conductivity of driver transistor 17, eventuating in a voltage rise at the collector thereof. This positive-going voltage appears across the secondary and tertiary windings of transformer 20, effecting a still further increase in the conductivity of timer transistor 29. A regenerative process is thus effected until timer transistor 29 becomes fully saturated, shunting the forward bias from driver transistor 17 and turning it fully off.

It can now be seen that the inventive circuit may be operated by practically any pulse-forming system, without regard to the output impedance thereof. Most of the current which is supplied to the base terminal of transistor 17 is derived from a source of biasing potential and the effective impedance of the base current source is essentially the sum of the resistances of resistors 31 and 32. It is therefore unnecessary to provide a separate, low-impedance buffer stage between horizontal oscillator 12 and the inventive circuit.

A further advantage of the described circuit inheres in its susceptibility to operation by various types of pulses. Since it is the initiation of a pulse by horizontal oscillator 12 which triggers the driver circuit, the duration of the pulse is practically immaterial. Similarly, the driver circuit can tolerate substantial variations in the magnitude and configuration of triggering pulses so that an inexpensive horizontal oscillator, whose components need not meet close tolerances, may be utilized.

Figures 2A, 2B, 2C:
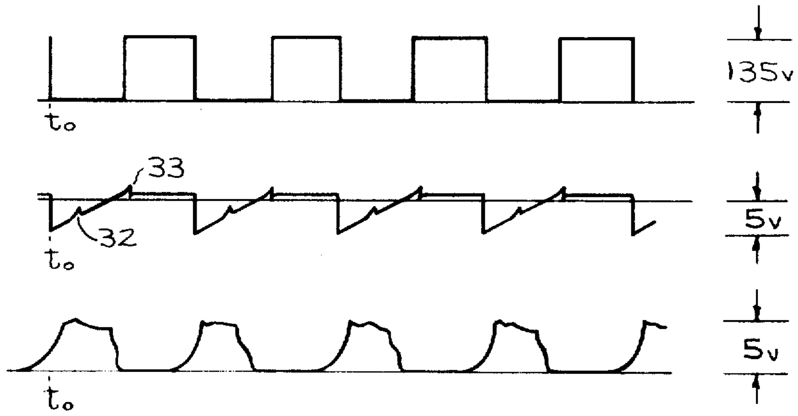
FIG. 2*a* is a representation of voltage pulses produced at a certain point of the circuit of FIG. 1.
FIG. 2*b* is a representation of voltage pulses arising at another portion of the circuit.
FIG. 2*c* represents triggered pulses suitable for application to the inventive circuit.

Turning now to FIG. 2*a*, there is illustrated a voltage waveform which appears at the collector terminal of driver transistor 17. FIG. 2*b* shows voltage appearing at the base terminal of the timer transistor 29, displayed upon the same time scale as the waveform of FIG. 2*a*. FIG. 2*c* shows pulses outputted by oscillator 12, which impinge upon the base terminal of driver transistor 17 and serve to trigger driver circuit 13.

At time $t_0$ a pulse produced by horizontal oscillator 12 appears as shown by FIG. 2*c*, the leftward or leading edge thereof ascending rapidly and biasing driver transistor 17 into a conductive state. Due to the regenerative action described above voltage at the collector terminal of the transistor drops rapidly, approximating the leading edge of a rectangular wave, as shown in FIG. 2*a*. Similarly, the transformed voltage shown in FIG. 2*b* which traverses timing capacitor 28 and appears at the base terminal of transistor 26 also evinces a sharp, practically immediate, decline. As the voltage at the collector of transistor 17 attains its minimum value, here substantially ground or zero potential, current ceases to flow to the timing capacitor 28 and capacitor 28 discharges at a substantially linear rate through timing resistor 30. This phenomonen produces a substantially linear rise in the voltage as illustrated by FIG. 2*b*. Voltage spikes or transients 32 and 33, caused by retrace pulse in tertiary winding 26 and the sudden rise of voltage across transistor 17, respectively, are damped by resistor 27 and do not affect the operation of transistor 29.

When the voltage at the base terminal of timer transistor 29 ascends to a value of approximately ground potential, the forward bias is removed from the base of transistor 17 whose conductivity then declines. The decline is hastened by the regenerative action of the circuit so that the voltage shown by FIG. 2a, arising at the collector of transistor 17, jumps rapidly to its original value. In the meantime, the pulse produced by horizontal oscillator 12 has declined to a substantially negligible value. However, it will be understood that the cessation of conduction of transistor 17 occurs due to the reinstitution of conduction of timer transistor 29. When transistor 29 becomes fully conductive, the base terminal of transistor 17 is substantially shorted to ground and therefore the transistor is forced to become nonconducting despite the production of an overly long pulse by horizontal oscillator 12.

When current flowing downwardly through limiting resistor 18 and primary winding 19 is suddenly interrupted by the sudden disabling of transistor 17, the collapse of the magnetic field about the primary winding produces a voltage which attempts to maintain current flow in the original direction. However, due to the presence of diode 22 the sudden voltage pulse which would otherwise arise at the collector of transistor 1 is mitigated and the current is returned to the potential source denominated Hi $B^+$. Due to the inherent nonlinearities of the diode a broad spectrum of high-frequency or RF radiation is produced which, althrough at a relatively low level, is deemed undesirable in a television receiver. For this reason, ferrite beads 23 and 24 are disposed about the conductors at either end of diode 22. As will be understood by those skilled in the art, each ferrite bead 23, 24 is formed in the shape of an annulus and surrounds the conductor with a low-reluctance magnetic path which acts in the manner of an inductive choke to impede or dampen high-frequency oscillations. While two such beads are disclosed, it is possible under certain circumstances to delete one bead and still achieve the desired damping effect.

In one embodiment successfully tested, it was found advisable to dispose secondary winding 25 and tertiary winding 26 on opposite sides of primary winding 19. This effectively isolates secondary winding 25 from transient voltages which appear across tertiary winding 26 due to retrace activity in the horizontal output stage. Such transients, if present, may be communicated through timing capacitor 28 to the base of timer transistor 29 and cause the transistor to enter its conductive mode at too early a time.

While it will be understood that values of the various circuit components may be varied to suit a particular application, the following values of circuit components are given by way of example:

| | |
|---|---|
| Resistors: | |
| **18** | 1 kilohm |
| **27** | 100 ohms |
| **30** | 110 kilohms |
| **32** | 820 ohms |
| **31** | 820 ohms |
| Capacitors: | |
| **16** | 0.0033 microfarad |
| **21** | 0.1 microfarad |
| **28** | 0.0082 microfarad |
| Transistors: | |
| **17** | 2N5059 (Texas Instruments) |
| **29** | Type 16E (General Electric) |
| Diode **22** | DT 30 (General Electric) |

As will be evident from the foregoing description, certain aspects of the invention are not limited to the particular details of the examples illustrated, and it is therefore contemplated that other modifications or applications will occur to those skilled in the art. It may, for instance, be found economically desirable to use only a single secondary winding for producing both an output signal for operating an output stage, and for applying a signal to the base of timing resistor 26. Through a resistive circuit for damping any transient voltages which may arise, further, the inventive circuit may be modified to produce voltage waveforms other than those illustrated in FIGS. 2*a–c*. It is therefore intended that the appended claims shall cover all such modifications and applications as do not depart from the true spirit and scope of the invention

What is claimed as new and desired to be secured by Letters Patent of the United States is:

1. In a television receiver cathode ray beam deflection system, controlled width pulse producing means for causing periodic beam deflection comprising:

first switch means, second switch means, first coupling means regeneratively coupling said first switch means to said second switch means, second coupling means regeneratively coupling said second switch means to said first switch means, said first switch means being responsive to sync pulses developed within said television receiver by changing its state of conduction in response to each such sync pulse, said first coupling means applying a signal to said second switch means indicative of the change of state of conduction of said first switch means to cause said second switch means to change its state of conduction, said second coupling means applying a signal to said first switch means indicative of the change of state of conduction of said second switch means to enhance the changing of state of conduction of said first switch means, said first coupling means including timing means to maintain said second switch means in its assumed state of conduction for a predetermined period of time, said second switch means returning to its original state of conduction at the end of said predetermined period, said first and second coupling means regeneratively driving said first and second switch means to their original states of conduction when said second switch means begins to return to its original state of conduction at the end of said predetermined period, said first switch means including output circuit means for outputting a pulse having a width determined by said timing means.

2. The invention as claimed in claim 1 wherein theoriginal state of conduction of said first switch means is OFF and the original state of conduction of said second switch means is ON.

3. The invention as claimed in claim 2 wherein said second coupling means includes means to bias said first switch means, said second switch means being coupled to said bias means to change the biasing of said first switch means when said second switch means is in the ON conductive state.

4. The invention claimed in claim 3 wherein said first coupling means includes a transformer, one secondary winding thereof being coupled to the input of said second switch means and the second secondary winding thereof comprising the output circuit means of said first switch means.

* * * * *